Aug. 1, 1944.  C. J. FUSCO  2,354,989
APPARATUS FOR WRAPPING
Filed Jan. 8, 1941    4 Sheets-Sheet 1

Inventor
Carlo J. Fusco
By Lyon & Lyon
Attorneys

Aug. 1, 1944.  C. J. FUSCO  2,354,989
APPARATUS FOR WRAPPING
Filed Jan. 8, 1941  4 Sheets-Sheet 3
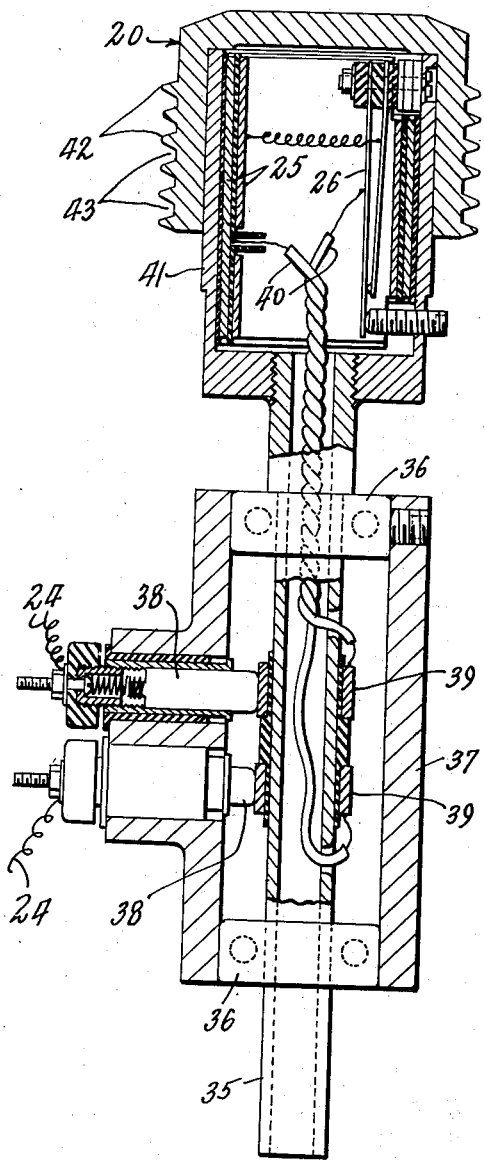
Fig. 6.
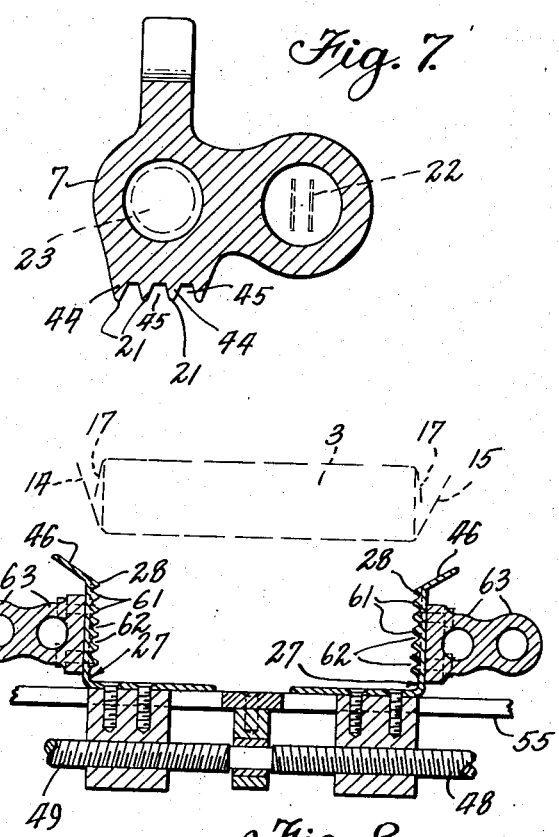
Fig. 7.
Fig. 8.
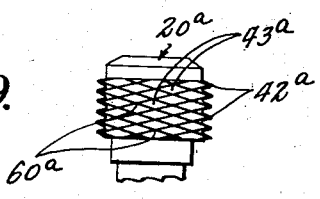
Fig. 9.
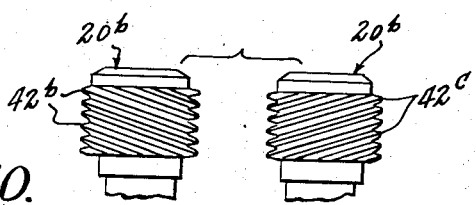
Fig. 10.
Inventor
Carlo J. Fusco
By Lyon & Lyon
Attorneys Aug. 1, 1944.                     C. J. FUSCO                          2,354,989
                              APPARATUS FOR WRAPPING
                              Filed Jan. 8, 1941         4 Sheets-Sheet 4

Inventor
Carlo J. Fusco
By Lyon & Lyon
Attorneys

Patented Aug. 1, 1944

2,354,989

UNITED STATES PATENT OFFICE 2,354,989

APPARATUS FOR WRAPPING

Carlo J. Fusco, San Francisco, Calif., assignor of forty-five per cent to Berne J. Ellis, San Francisco, and ten per cent to Lester H. Eastin, Fresno, Calif.

Application January 8, 1941, Serial No. 373,625

1 Claim. (Cl. 93—2)

This invention relates to a method and apparatus for wrapping, and is more particularly directed to a method and apparatus for wrapping of articles, boxes, packages, or the like, with pliable materials susceptible of heat-sealing.

There are generally two classes of pliable relatively transparent wrapping materials now available for wrapping articles, containers for articles, and the like. These two classes of material may be broadly defined as those formed from cellulosic material and those which find their origin in rubber-like or rubber substitute material. Of these two classes, those most commonly referred to are Cellophane, "Pliofilm," "Protectoid" and "Kodapac." It is often desirable in a single packing plant to utilize one or the other, and sometimes both, of said types of material for the merchandise product or containers for such merchandise.

Considerable difficulty has heretofore been encountered in providing an accurate, easily operated and inexpensive form of devise for the wrapping with material of the class of "Pliofilm" in that the said material, while susceptible of heat sealing, is also easily destroyed by the improper application or prolonged application of heat to the wrap or folded portions of the said material.

It is therefore an object of this invention to provide a method of wrapping articles, or containers for articles, with material of the class of "Pliofilm" wherein the heat-sealing of the "Pliofilm" is accomplished through a multiplicity of points of application of heat to the folded or wrapped sections of the said material, while maintaining between the points of origin of heat application free air columns to avoid localized over-heating of the Pliofilm at the portions heat sealed.

Another object of this invention is to provide a device applicable for heat sealing of Pliofilm type of material, which includes means for effecting a heat sealing of the overlapped and folded portions of the "Pliofilm," and which means include a plurality of spaced contacting heating elements adapted to be brought into instantaneous contact with the said "Pliofilm" portions and which are separated by air gaps.

Another object and advantage of this invention is to provide a method for heat sealing material of the "Pliofilm" type which includes heating elements which are instantaneously brought in contact with the folded portions of the "Pliofilm," which heat elements are maintained in spaced relation to maintain air gaps therebetween, and which heating elements move in the direction of movement of the container or article wrapped with the said material in order to avoid localized heating or destruction of the said material at the folded portions thereof.

Another object of this invention is to provide a machine for the heat-sealing of wrapping material such as Cellophane, "Pliofilm," "Protectoid," "Kodapac" or other similar materials, and which is of variable construction in order to accommodate wrapped packages of different sizes and shapes.

Other objects and advantages of this invention it is believed will be apparent from the following detailed description of a preferred embodiment thereof as illustrated in the accompanying drawings.

In the drawings:

Figure 6 is a sectional view taken substantially on the line 6—6 of Figure 5.

Figure 7 is a sectional view taken substantially on the line 7—7 of Figure 1.

Figure 8 is a sectional view taken substantially on the line 8—8 of Figure 3.

Figure 9 is an elevation in modified form of the heat applying anvil embodying my invention.

Figure 10 is an elevation of a pair of heat applying anvils embodying my invention.

Figure 1:
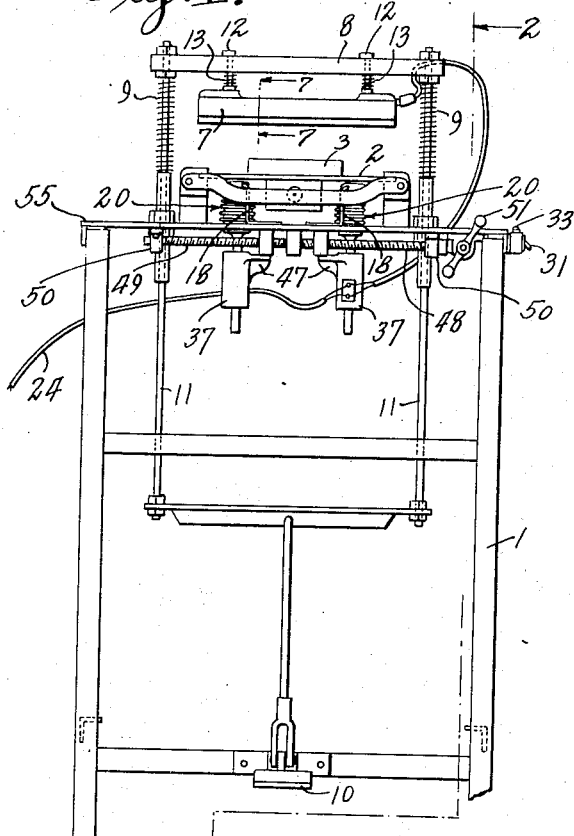
Figure 1 is a front elevation of the device embodying my invention.
Figure 2:
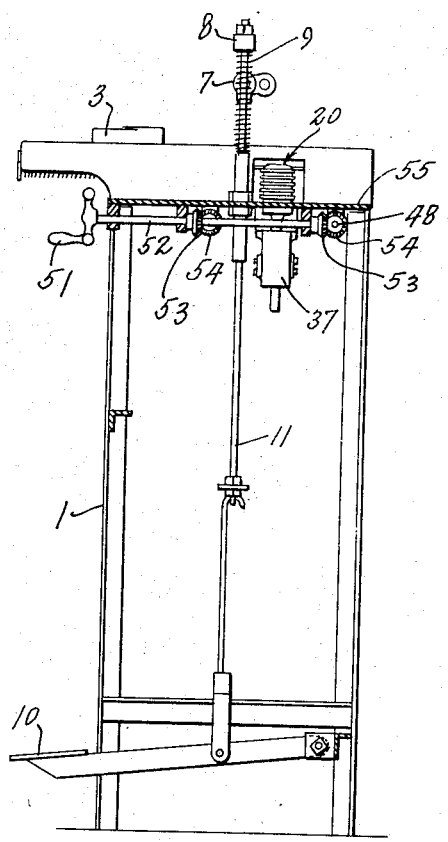
Figure 2 is a side elevation partly in vertical section and taken substantially on the line 2—2 of Figure 1.
Figure 4:
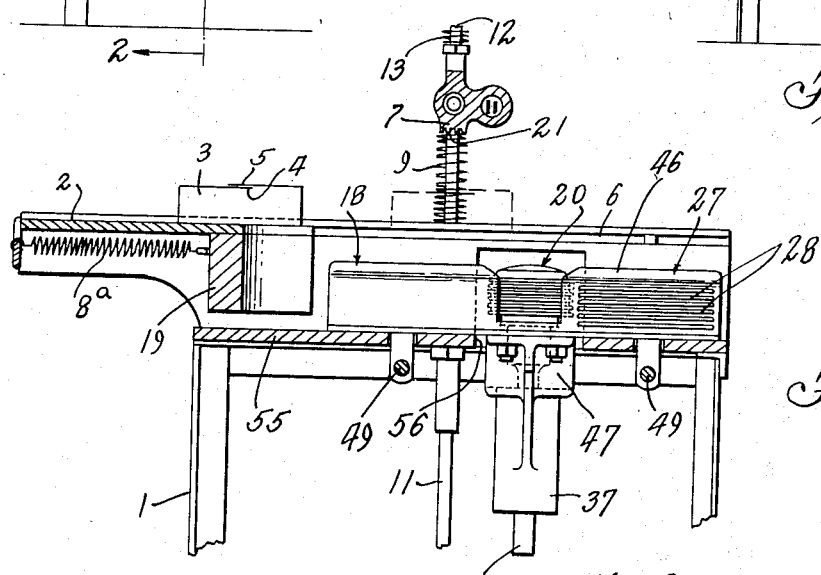
Figure 4 is a sectional view taken substantially on the line 4—4 of Figure 3.
Figure 3:
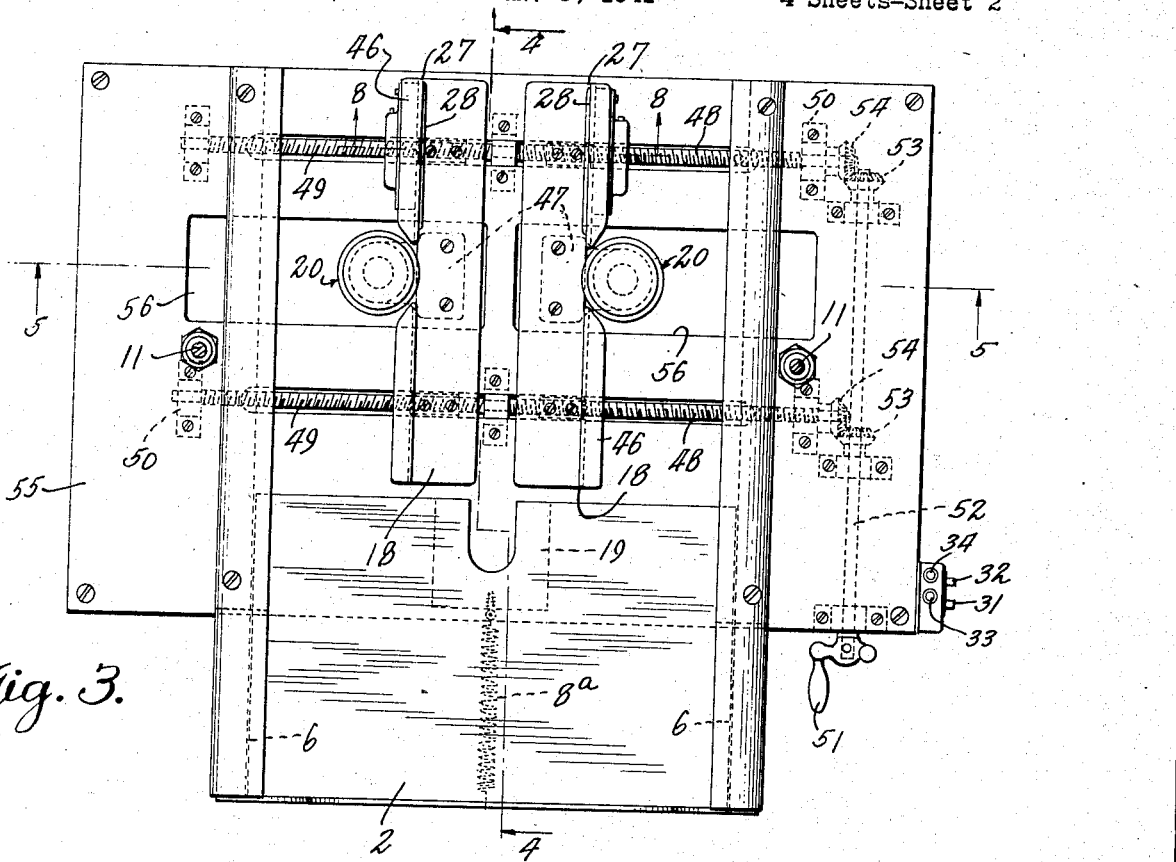
Figure 3 is a top plan view of the device embodying my invention.
Figure 5:
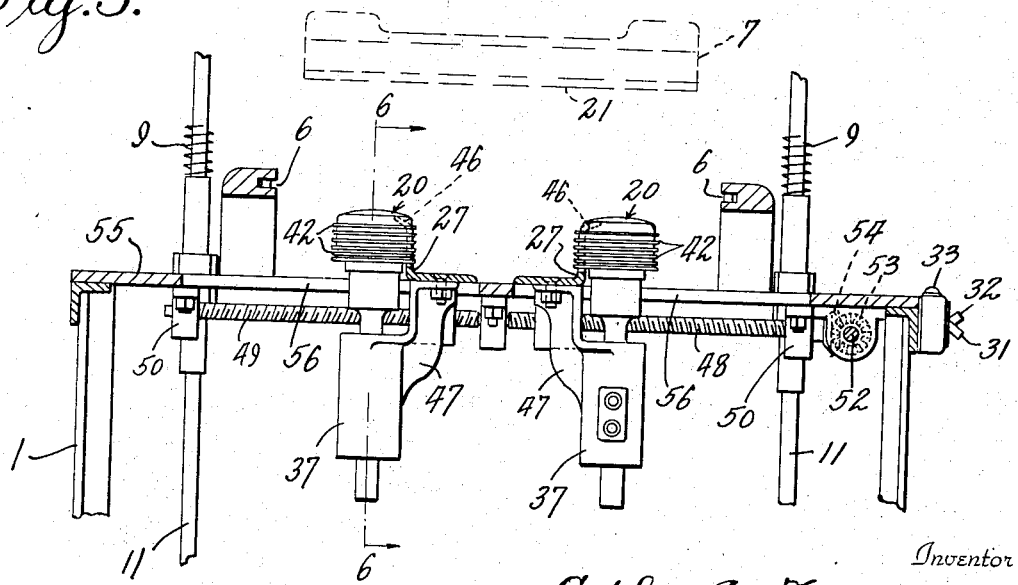
Figure 5 is a sectional view taken substantially on the line 5—5 of Figure 3.
Figure 11:
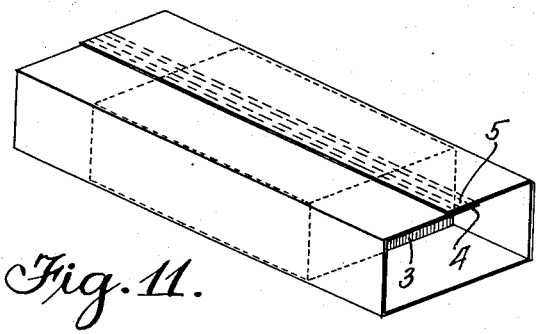
Figure 11 is a perspective view illustrating the first step of wrapping in accordance with my invention.

In the preferred embodiment of my invention illustrated in the accompanying drawings, 1 indicates a suitable standard or table for suitably supporting the elements of the device embodying my invention. The table provides a folding and wrapping plate 2 upon which the package or article 3 to be wrapped may be supported. The article or merchandise 3 to be wrapped is supported upon the upper surface of the supporting plate 2 and is, by the "Pliofilm" type of material, wrapped therearound as indicated in Figure 11, so that its edges 4 and 5 overlap. The supporting plate 2 is supported between guideways 6 so that it may be reciprocated toward and away from the operator to a position under the overlapped sealing anvil 7. The platform 2 is yieldably held back toward the operator by means of a spring 8ª.

After the article has been wrapped as indicated in Figure 11, the operator moves the same forward in position under the die 7 by moving the platform 2 away from itself. The anvil 7 is suitably supported upon a crosshead 8 which is yieldably urged upwardly by means of springs 9 to a position elevated above the package or article 3. When the said article has been properly positioned, the operator depresses the treadle 10 connected through the medium of the links 11 with the crosshead 8, thereby moving the anvil or die 7 down to contact the overlapped edges 4 and 5. It is preferable that the anvil 7 be yieldably connected with the crosshead 8 so as to permit a certain amount of yielding pressure being exerted during the heat sealing operation, therefore the anvil 7 is supported upon the bolt members 12 and is yieldably urged downward by means of the springs 13. Any suitable form of stop means may be employed for arresting the downward movement of the anvil 7 along the bolts 12. Means as will be hereinafter more specifically described are supplied for heating the anvil 7.

Figure 12:
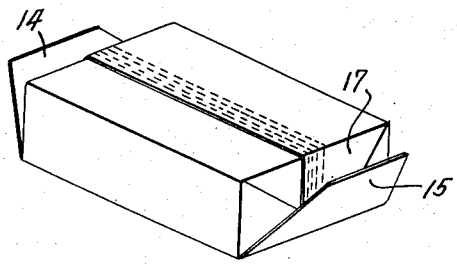
Figure 12 is a view illustrating the second step of wrapping as carried out in accordance with my invention.
Figure 13:
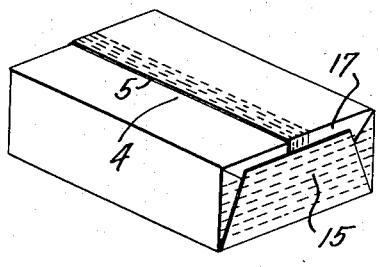
Figure 13 is a perspective view of a wrapped container wrapped in accordance with my invention.
Figure 14:
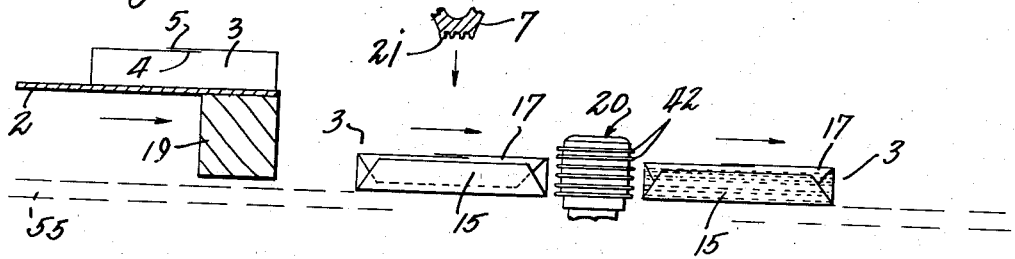
Figure 14 is a diagrammatic view illustrating the method embodying my invention.

After the overlapped sections 4 and 5 have been properly heat sealed with the method of heat sealing which will be hereinafter specifically described with respect to both the overlapped edge heat sealing and the folded end heat sealing operations, the package is lifted from the support 2 with the ends folded as indicated in Figure 12, and with the folded end sections 14 and 15 free from the ends of the container or merchandise, and the package having its wrapping as thus positioned, is passed downwardly between a pair of guides 18 which are positioned apart just that distance required for positioning the ends 14 and 15 in contact with the folded sections 17 of the "Pliofilm" or other material wrapping. When thus positioned, the operator then places another package upon the folding support 2 and repeats the operation as previously described.

The plate 2 has a pusher element 19 which projects downwardly from the support 2 to a position so that it will engage a wrapped package or article between the guides 18 so that upon subsequent operation of moving another package 3 under the anvil 7, the pusher element 19 will engage the rear edge of the said package and propel the same between the guides 18 and between the end-heating anvils 20.

The relationship of the parts is such that the forward movement of the movable platform or folding platform 2 is sufficient to propel the article or package completely by the end anvils 20. By this means, the sealing operation is completed at the ends during a moving contact and when "Pliofilm" or a similar heat-sealing material is employed, the end anvils 20 are mounted so that they will travel with, or rotate, during the passing of the ends of the article or package between them so as to avoid the ripping or destructive tendency of heated dies during movement of the "Pliofilm"-wrapped article that is being heat sealed. By rotating the anvils 20 during the end heat sealing operation, sufficient heat penetrates the multiple folds of the material to insure complete heat sealing of these multiple folds, but avoids localized heating because a continuously new heated surface is applied along the sealed area as this sealed area is being formed.

Material of the type of "Pliofilm" heat seals by fusion, and when heated to the fusing point, tends to flow and to adhere to the heated surface so that by using the principle of instantaneous anvil and heat application as thus provided, a continuously formed heat seal is provided which will penetrate the multiple folds of the "Pliofilm" to insure complete heat sealing along the lines of application of the anvil surfaces to the multiple folds.

As will hereinafter be specifically described, it is essential during this type of heat sealing to perform the heat sealing by line contact and maintaining a free air column between the lines of contact so as to avoid complete fusion and overheating of the "Pliofilm" during such contact.

Figure 15:
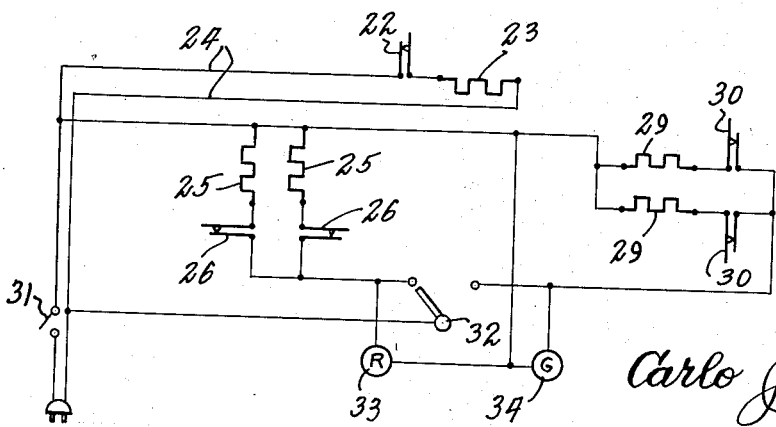
Figure 15 is a wiring diagram.

In order to properly heat seal the "Pliofilm" type of material, it is essential that just the right amount of heat be applied to the material to bring the material to the point of adhesiveness or tackiness without rendering the material completely fluid. It is therefore essential to provide some form of thermostatic means for heating the anvils 20 and 7 to the right temperature. In accomplishing this result, I have employed a thermostatic control in connection with the electric heating means utilized for heating applying surfaces of the anvils 7 and 20. In the case of the anvil 7, this thermostatic means is inserted in the electrical circuit connecting the heating elements for the anvil in any suitable or desirable means preferably so that the heat responsive thermostatic element is responsive to the degree of temperature of the anvil 7 at or near the anvil heat applied surfaces 21. This thermostatic means is diagrammatically illustrated in Figure 15 at 22. The electrical heating elements are indicated at 23 as connected in the electrical supply wires 24. Similarly in this electrical diagram, heating elements 25 for the anvils 20 are connected with the electrical supply lines through the medium of the thermostatically controlled circuit breaking elements 26. Other heat applying means or anvils may be provided in connection with the rear guides 27 as indicated at 28, particularly for the purpose of heat sealing Cellophane wrapped articles or articles wrapped with material which requires a continued application of heat over a period of time. These heating elements 28 are heated by the electrical heating elements 29 likewise controlled through thermostatically operated circuit breakers 30 also connected in the electrical circuit with the supply lines 24.

A switch 31 is provided in the supply lines and a transfer switch 32 is provided for determining which of the heating elements 20 or 29 is being employed, depending upon the type of wrapping material being utilized.

Connected in each of the circuits to the heating elements 20 or 28 are colored light elements 33 and 34, one of which may be green and the other of which may be red to indicate visibly which pair of heating elements is heated.

The rotatably mounted heating elements or anvils 20 are preferably of the following construction (Figure 6): A hollow shaft 35 is rotatably supported by means of spaced bearings 36 in a sleeve casting 37 which is secured to the guide elements 18 to move therewith. Brushes 38 are provided and contact the rings 39 carried by the shaft 35. Wires 40 are connected with the rings 39 and extend into the interior of the hollow shaft 35 and out the end thereof to make their required electrical connection with the heat elements 25 and with the thermostatically controlled circuit breaking elements 26.

Any suitable or desirable form of brush construction or means for yieldably urging the brushes into electrical contact with the rings 39 may be employed.

The heating elements 25 are mounted within heads 41 upon which the anvils 20 are slidably and removably positioned. The anvils 20 are of general cylindrical form and have heating surfaces composed of a multiplicity of annular heating rims 42 spaced apart along the length of the cylinders to provide air gaps 43 between the points of contact with the surfaces to be heat sealed. Similarly the anvil 7 is provided with a plurality of longitudinally extending line contact surface elements 44 between which air passages 45 are provided.

Any suitable or desirable means may be provided for adjustably positioning the guide elements 18 and 27 to accommodate articles or packages of different widths therebetween with their folded ends properly held in position for heat sealing. The means as herein illustrated are of the following construction:

The guide means 18 and 27 include angle members having their upper edges outwardly turned as indicated at 46 so as to provide guides for positioning the packages and the end sections of the wrappings between the guides. The horizontal flanges of each of said guide members are secured to the supporting section 47 of the sleeve castings 37 by any suitable means. The supporting sections 47 are threaded to receive the screws 48 and 49. The screws 48 and 49 are formed on the continuous rod supported in bearing members 50. The screws 48 and 49 are respectively right- and left-handed so that as the rod upon which they are formed is rotated in one direction, the said guides 18 and 27 will be caused to move inward or outward toward or from each other. These rods are rotated by means of a handle member 51 secured to a shaft 52 carrying gears 53 held in position of drive and mesh with the gears 54 secured to the said screw rods. Said supporting and adjusting structure is mounted upon the base plate 55 of the supporting table 1 and this base plate 55 is cut away as indicated at 56 to permit the heat sealing members 20 and 28 to move inward and outward with the guide members 18 and 27.

In the modified form of my invention as illustrated in Figure 9, the heat sealing anvils 20ª are illustrated as being formed with their contacted annular rims 42ª formed or positioned upon the periphery of the cylindrical portions at cross-angles from the horizontal to produce substantially diamond-shaped enclosed sealing ridges 60ª within which air pockets 43ª are maintained. Through the use of this type of end-sealing anvils both horizontal and vertical sealing is accomplished providing the substantially fluid-tight form of seal.

In Figure 10 the sealing anvils 20ᵇ are similar to the sealing anvils 20 heretofore described, or those of Figure 9, except in Figure 9 the contacting ridges 42ᵇ and 42ᶜ are oppositely turned on the anvils so that through the medium of a pair of such heating anvils 20ᵇ a crossed heat sealing is effected by positioning one of said sealing members 20ᵇ in the line of movement of the package or box being wrapped so that one of said members 20ᵇ effects its seal by diagonally extending sealing lines at the ends of the wrap while the next succeeding anvil 20ᵇ forms its sealing in a substantially reverse angle. Thus substantially the same type of seal is formed with the two sealing members 20ᵇ at each end of the box or wrapped material as is obtained through the use of the single die or anvil member 20ª. In some types of material, however, which are particularly susceptible to damage upon supplying excess heat, it is essential to utilize the type of heating die illustrated in Figure 10 where a completely sealed connection between the overfolds of the material is required.

The apparatus as heretofore described is particularly designed and constructed and the method of heat sealing is particularly applicable for material which seals by heat fusion. This material is of the type of "Pliofilm" or other transparent or semi-transparent wrapping material which tends to become fluid under elevated temperature.

The apparatus and method, however, embodying my invention is applicable for the heat sealing of both this type of material and that type of material which is generally classified as Cellophane, which is not easily destroyed by heat but which requires a rather long period of application of heat to the surface and the application of pressure with the heat in order to accomplish heat sealing.

In order to perform end sealing of the Cellophane type of material, the rear guides 27 are provided with the heated anvils or surfaces 28 which are constructed similar to the heating anvil 7 in that they are provided with a multiplicity of longitudinally extending heating surfaces 61 having the air spaces or air channels 62 therebetween. As heretofore described, these anvils are heated through the use of electrical heating elements thermostatically controlled and positioned within the sleeves or cylinder sections 63 of the supporting structure for the heating anvils 28 in any suitable or desirable manner.

In operation when the heating surfaces or anvils 28 are heated, the anvils 20 are not heated due to throwing the switch 32 in the electrical circuit. As the guide members 27 are located rearwardly along the path of movement of the containers, it will be apparent that the wrapped packages or boxes when positioned between the guides 27 come to a position of rest at such position and are only moved from this position when a further wrapped package or article is dropped down between the guide sections 18 and thereafter moved forwardly through the medium of the pusher section 19 of the wrapping support 2. Thus the wrapped package will be retained in position between the anvils 28 for a period of time sufficient to permit heat sealing of this type of material.

It will of course be appreciated that the direction and extent of the ridges 61 of the heating anvils 28 may be modified in substantially the same manner as are the heating ridges of the anvils 20 and as specifically illustrated for the anvils 20 in Figures 9 and 10.

Having fully described my invention, it is to be understood that I do not wish to be limited to the details herein set forth, but my invention is of the full scope of the appended claim.

I claim:

In a device for heat-sealing thermoplastic wrapping material, the combination of a movable support upon which a wrapped package is supported, means above the movable support for heat-sealing the overlapped edges of wrapped material on said package, a lower supporting means positioned below the movable support, spaced guide means carried by the lower supporting means for confining the folded ends of the wrapping material at the ends of the package, a pair of heat-sealing anvils operatively associated with the guides and spaced apart a distance substantially equal to the length of the package, and pusher means carried by the movable support for moving the package between the guides and heating anvils to heat-seal the wrapped ends of the package.

CARLO J. FUSCO.